United States Patent [19]
Garrett et al.

[11] Patent Number: 5,720,091
[45] Date of Patent: Feb. 24, 1998

[54] INDEXER WITH CAM-ACTUATED LOCK

[75] Inventors: John A. Garrett, Webb City; Terrance L. Myers, Joplin; Jerry J. Reece, Webb City, all of Mo.

[73] Assignee: L&P Property Management, South Gate, Calif.

[21] Appl. No.: 629,725

[22] Filed: Apr. 9, 1996

[51] Int. Cl.$^6$ .................... B23B 3/16; F16H 55/00
[52] U.S. Cl. ............................ 29/48.5 R; 74/820
[58] Field of Search ................ 29/48.5 R, 48.5 A, 29/39, 40, 35.5; 74/820, 436, 813.2

[56] References Cited

U.S. PATENT DOCUMENTS

| | | | |
|---|---|---|---|
| 3,443,455 | 5/1969 | Zugel | 74/820 |
| 3,485,965 | 12/1969 | Bleibtrev et al. | 74/820 X |
| 3,546,958 | 12/1970 | Parks | 74/436 |
| 3,757,609 | 9/1973 | Zugel | 74/826 |
| 3,835,723 | 9/1974 | Zugel | 74/436 |
| 4,095,489 | 6/1978 | Hasegawa | 29/48.5 A X |
| 4,317,385 | 3/1982 | Harvey et al. | 74/820 X |
| 4,550,631 | 11/1985 | Yamazaki et al. | 29/48.5 R X |
| 4,563,910 | 1/1986 | Miyazaki | 74/820 |
| 5,123,149 | 6/1992 | Togana et al. | 29/48.5 R |

FOREIGN PATENT DOCUMENTS

| | | | |
|---|---|---|---|
| 1650811 | 1/1970 | Germany | 74/820 |
| 1456670 | 2/1989 | U.S.S.R. | 74/820 |

OTHER PUBLICATIONS

"Exhibit A".
"Exhibit B".
"Exhibit C".

*Primary Examiner*—William R. Briggs
*Attorney, Agent, or Firm*—Wood, Herron & Evans, L.L.P.

[57] ABSTRACT

An indexing mechanism for providing intermittent rotation to a device includes a rotatable driven member having a pair of spaced oppositely disposed arcuate slots and a driving member having a pair of angularly spaced driving rollers engageable with the slots for rotatably accelerating and decelerating the driven member. The driven member locking rollers adjacent the slots engageable with the outer periphery of the driving member to prevent rotation of the driven member when it is not being indexed by the driving member. The indexing mechanism further includes a positive lock mechanism actuatable by a cam follower that rides within an endless cam track in the driving member. The positive lock mechanism is actuated by the cam follower to engage the indexed device and prevent rotation of the device when it is not being indexed.

3 Claims, 4 Drawing Sheets

INDEXER WITH CAM-ACTUATED LOCK

FIELD OF THE INVENTION

The present invention relates to indexing mechanisms, and more particularly to indexing mechanisms having a driven member with slots and a driving member with pins or rollers engageable with the slots to accelerate and decelerate the driven member.

BACKGROUND OF THE INVENTION

Rotary indexing mechanisms for providing intermittent rotational motion to a device such as a tool-holding device are well known. Such indexing mechanisms generally have included a rotatable driving member and a rotatable driven member, with the driving member having pins or rollers for engaging notches or slots in the driven member. The slots are angularly spaced apart on the driven member and the pins or rollers are angularly spaced member and the pins or rollers are angularly spaced apart on the driving member so that a complete revolution of the driving member produces less than a complete revolution of the driven member. By virtue of the driven member's engagement with the device to be indexed, the partial revolution of the driven member thereby causes the device to be indexed from one position to another.

One such indexing mechanism, known in the trade as a "Geneva" indexer, has a driving member comprising a generally circular disc that has a single pin or roller mounted near the periphery of the disc. The driven member comprises a circular disc having a number of wedge-shape members angularly spaced around the disc. The space in between each pair of adjacent wedge-shaped members defines a slot for receiving the pin or roller on the driving member. In a typical Geneva indexer, there are four wedge-shaped members, thereby defining four slots 90 degrees apart on the driven member. The driving member and the driven member are assembled in an overlapping relationship so that rotation of the driving member brings the pin or roller into engagement with one of the slots in the driven member and thereby causes the driven member to rotate through an angle of 90 degrees. Continued rotation of the driving member then causes the pin or roller to exit the slot and the rotation of the driven member ceases until the pin or roller comes back around and engages the next slot. Thus, continuous rotation of the driving member results in intermittent 90 degree rotations of the driven member, which thereby results in intermittent idexing of the device to be indexed.

A shortcoming of the Geneva-type indexer described above is that they have limited torque-handling capability. As a consequence, the speeds at which they can be operated are limited, since the torque loads are proportional to acceleration. Geneva-type indexers are also heavy, which further adds to the torque problem, since the torque loads are also proportional to mass.

Indexers of the type described in U.S. Pat. No. 3,835,723 issued Sep. 17, 1974, the disclosure of which is incorporated herein by reference, solve many of the torque and speed problems. However, such indexers do not provide means for positively assuring that the indexed device will not rotate when it is not being indexed. Complete absence of rotation is important in many applications. For example, in a rotary tool-holding device containing a number of different tools to be sequentially accessed by a machine, the tool-holding device must be precisely aligned with the tool-grabbing mechanism of the machine in order to assure proper engagement of the tool-grabbing mechanism with the tool. It is therefore desirable to eliminate as much as possible the "play" in the indexed device.

SUMMARY OF THE INVENTION

The present invention provides an indexer with high torque capacity that can be operated at high speed, while also providing a positive lock mechanism that prevents rotation of the indexed device when it is not being indexed. The indexer of the present invention has a driving member that has a cam track that cooperates with a cam roller or follower. The cam follower is connected to a mechanism for preventing rotation of the indexed device when it is not being indexed, and for permitting rotation of the device when it is being indexed.

One such embodiment of the present invention includes a driven member having at least one pair of spaced oppositely disposed arcuate slots for receiving a pair of angularly spaced rollers mounted on the driving member. Rotation of the driving member brings one of the rollers into engagement with the leading slot of the pair of slots on the driven member, which causes the driven member to rotatably accelerate. Further rotation of the driving member brings the other roller on the driving member into engagement with the trailing slot of the pair of slots on the driven member, which causes the driven member to decelerate and stop rotating. Thus, one complete revolution of the driving member results in a partial revolution of the driven member.

The indexer also includes locking means for releasably locking the driven member against rotation when the driving rollers are not engaged in the slots on the driven member. The locking means includes a pair of rollers angularly spaced on the driven member adjacent the slots. The locking rollers contact the circular peripheral surface of the driving member at all times except when the driving rollers are engaged in the slots. A recess in the circular peripheral surface of the driving member in between the two driving rollers engages one of the locking rollers at approximately the same time that the first driving roller engages the leading slot on the driven member. This permits the other locking roller to move away from the circular peripheral surface and thereby permits the driven member to rotate. The recess disengages from the locking roller at approximately the same time that the second driving roller disengages from the trailing slot on the driven member.

In a preferred embodiment, the driven member has four pairs of slots and four locking rollers equally spaced about the circumference of the driven member. Thus, when the second driving roller disengages from the trailing slot and the recess disengages from one of the locking rollers, another of the locking rollers moves into contact with the peripheral surface of the driving device and prevents the driven member from rotating.

The locking rollers are maintained in engagement with the peripheral surface of the driving member.

The mechanism of the present indexer for preventing unwanted rotation of the indexed device includes a linkage having one end connected to a cam follower and the other end connected to a positive lock mechanism. The driving member has a cam track configured so that as the first driving roller engages the leading slot of a slot pair on the driven member, the cam follower riding within the cam track is moved generally away from the rotational axis of the driving member, which movement causes the linkage to actuate and disengage the positive lock mechanism from the indexed device so that the indexed device can rotate. The cam track is further configured so that as the second driving roller disengages from the trailing slot of a slot pair, the cam follower is moved generally toward the rotational axis of the driving member, which causes the linkage to actuate and engage the positive lock mechanism with the indexed device so that the device does not rotate when it is not being indexed.

BRIEF DESCRIPTION OF THE DRAWING

The above and other objects and advantages of the present invention shall be made apparent from the following detailed description of the preferred embodiments taken in conjunction with the accompanying drawings wherein.

DETAILED DESCRIPTION OF SPECIFIC EMBODIMENTS

Figure 1:
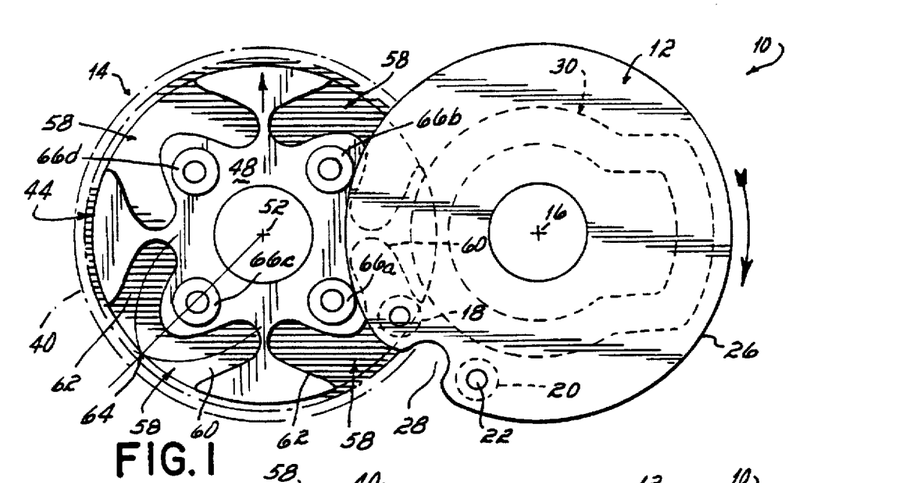
FIG. 1 is a top elevational view of the driving member and driven member of a preferred embodiment of the present invention.
Figure 2:
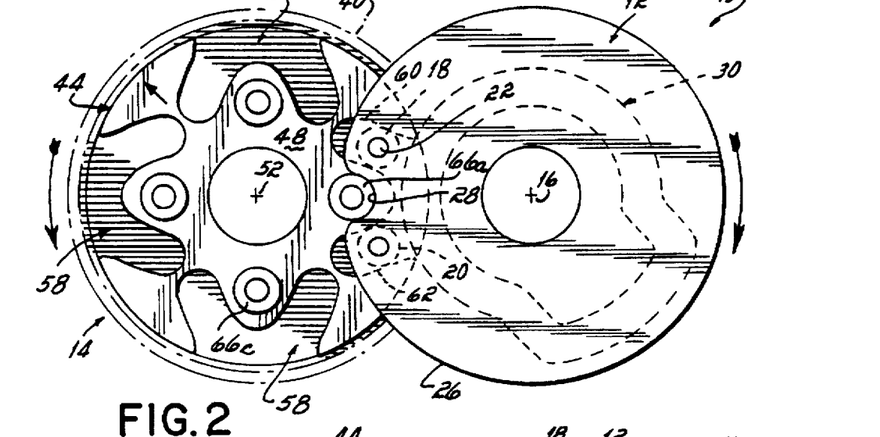
FIG. 2 is a view similar to FIG. 1 but showing the members in different rotated positions.
Figure 3:
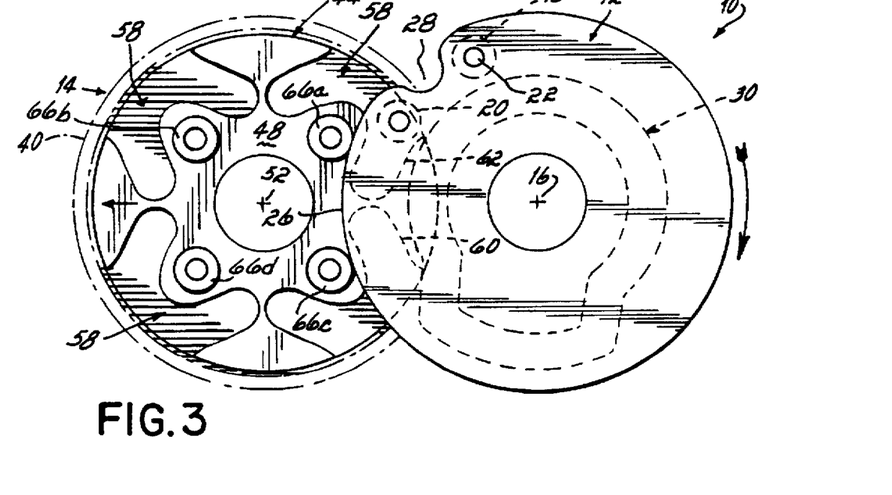
FIG. 3 is a view similar to FIGS. 1 and 2 but showing the members still further rotated.

Referring to FIGS. 1-3, an indexing mechanism 10 includes a driving member 12 and a driven member 14. Driving member 12 comprises a generally circular flat disc and is made to rotate about its rotational axis 16 by means of a shaft (not shown) on which the driving member 12 is mounted. Driving member 12 has rollers 18 and 20 rotatably mounted on studs 22 which are secured in holes in the driving member 12. Rollers 18 and 20 are angularly spaced apart on the driving member 12 and extend from the lower surface (not shown) of the driving member 12 as shown. Driving member 12 has a circular peripheral surface 26 which has a recess 28 located between the rollers 18 and 20.

The driving member 12 also has a cam track 30 formed in the lower surface. The cam track 30 is located inward of the rollers 18 and 20 and extends generally circumferentially about the driving member 12 to form an endless closed loop. As the driving member 12 rotates about its rotational axis 16, the cam track 30 cooperates with a cam roller 34 (see FIG. 4) to actuate a linkage 70 which engages and disengages a positive lock mechanism, the structure and purpose of which are described in detail below.

Figure 4:
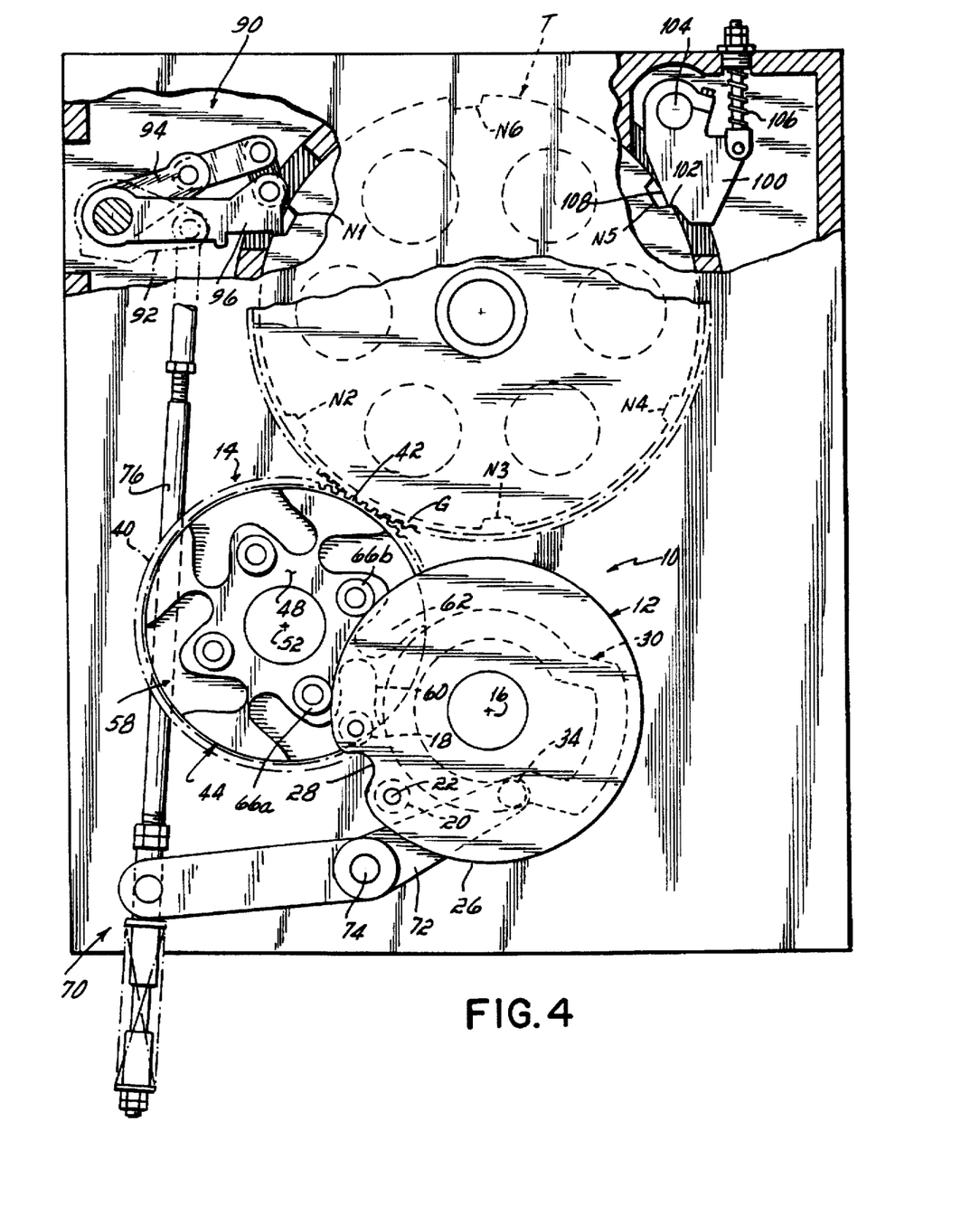
FIG. 4 is a top elevational view of a preferred embodiment of the present indexer showing the details of the positive lock mechanism and its connection with the linkage and cam follower, with the positive lock mechanism engaging a device to be indexed.

With reference to FIG. 4, driven member 14 comprises a circular gear 40 having gear teeth 42 about its periphery, and a circular indexing disc 44 concentrically secured to the gear 40 by means of bolts (not shown). The indexing disc 44 has an upper surface 48 which, when the indexing mechanism 10 is assembled, faces the lower surface of the driving member 12. The driven member 14 is concentrically secured to a hub (not shown) which rotates about a rotational axis 52.

The upper surface 48 of the indexing disc 44 has, in a preferred embodiment, four pairs of arcuate slots 58 spaced 90 degrees apart around the circumference of the indexing disc 44. The four pairs of slots 58 provide four indexing positions of the driven member 14. Thus, as described in more detail below, for each 360 degree rotation of the driving member 12, the driven member 14 is advanced 90 degrees in the opposite rotational direction.

With reference to FIG. 1, each pair of slots 58 comprises a leading slot 60 and a trailing slot 62. The leading slot 60 extends from a point 64 on the periphery of the indexing disc 44 inwardly along a circular arc that is convex in the outward direction (away from the axis 52), while the trailing slot 62 extends from the same point 64 on the periphery of indexing disc 44 along a circular arc that is convex in the outward direction, such that the leading slot 60 is approximately a mirror image of the trailing slot 62 about a line extending from point 64 through the center of the indexing disc 44.

In the preferred embodiment providing four index positions as shown in the figures, the driven member 14 has four rollers 66a–66d spaced 90 degrees apart around the circumference of the driven member 14. Each roller extends from the upper surface 48 of the indexing disc 44 midway between the leading slot 60 and the trailing slot 62 of each pair of slots 58. The rollers 66a–66d are mounted on the indexing disc 44 in a manner similar to that previously described in connection with the rollers 18 and 20 on driving member 12.

The driving member 12 and the driven member 14 are mounted in an overlapping relationship with the rollers 18 and 20 extending toward the indexing disc 44 for reception in each pair of slots 58, as shown in FIG. 4. The peripheral surface 26 of the driving member 12 lies at a predetermined radius from axis 16. The rollers 66a–66d are mounted on the indexing disc 44 so that when the driving member 12 is in the position shown in FIG. 4 a pair of rollers 66a and 66b are in contact with the peripheral surface 26, rollers 66a and 66b are "preloaded"; that is, there is an interference fit between the rollers 66a and 66b and peripheral surface 26. The rollers 66a–66d are preloaded by mounting them on the indexing disc 44 such that the roller engaging surfaces that contact the peripheral surface 26 lie on a circle whose radius from the axis 16 is slightly smaller than the radius of the peripheral surface 26.

The operation of indexing mechanism 10 is now described with reference to FIGS. 1 through 3. FIG. 3 shows the driving member 12 at the beginning of a dwell phase during which rotation of the driving member 12 in the clockwise direction produces no rotation of the driven member 14. The driven member 14 is held in a fixed position with the aid of locking means that include the rollers 66a and 66b.

As the driving member 12 continues to rotate in a clockwise direction, the roller 18 comes back around and enters the leading slot 60 in one of the pairs of slots 58, as shown in FIG. 1. The roller begins to accelerate the driven member 14 in a counterclockwise direction. A short time later, the driving member 12 has moved to the position shown in FIG. 2, with the recess 28 in the peripheral surface 26 engaging roller 66a and the roller 20 engaging the trailing slot 62. By this same time, the roller 66b has moved away from the peripheral surface 26.

As the driving member 12 further rotates clockwise, the driven member continues to rotate counterclockwise until the roller 20 begins to exit the trailing slot 62, at which time the driven member 14 begins to decelerate. As shown in FIG. 3, when the roller 20 ceases to contact the trailing slot 62, the driven member 14 stops rotating. By this time the roller 66a has disengaged the recess 28 and a third roller 66c has come into firm engagement with the peripheral surface 26 on the driving member 12. Rollers 66a and 66c thereafter act to prevent further rotation of the driven member 14 as the driving member 12 continues to rotate, eventually coming back to the position shown in FIG. 1 for the beginning of another indexing movement.

Thus, it can be seen that each 360 degree clockwise rotation of the driving member 12 produces a 90 degree counterclockwise rotation of the driven member 14. By virtue of the engagement of gear 40 with a gear G on a tool-holding device T as shown in FIG. 4, the 90 degree rotation of the driven member 14 produces a clockwise rotation of the tool-holding device T. The degree of indexing of the tool-holding device T produced by each 90 degree rotation of driven member 14 can be varied by suitable selection of gear G, as is well known in the mechanical arts. In the embodiment shown in FIG. 4, each 90 degree rotation of the driven member 14 produces a 60 degree indexing of the tool-holding device T.

The linkage 70 and positive lock mechanism 90 are now described with reference to FIGS. 4 through 6. A cam follower 34 rides within the cam track 30 in the driving member 12. The cam follower 34 is connected to one end of a lever 72 which pivots about a pin 74. The other end of the lever 72 is connected to an actuator arm 76. The actuator arm 76 is in turn connected to positive lock mechanism 90 mounted adjacent to the tool-holding device T and including a lock lever 92, an articulated lifter arm 94, and a locking pawl 96. The lever 72, actuator arm 76, and positive lock mechanism 90 are arranged so that when the cam follower 34 is at the position within cam track 30 shown in FIG. 4, the locking pawl 96 is engaged in a notch N1 in the tool-holding device B. The notch N1 has a clockwise-facing surface that is contacted by the locking pawl 96 to prevent rotation of the device T in the indexing (clockwise) direction, as shown in FIG. 4.

Figure 5:
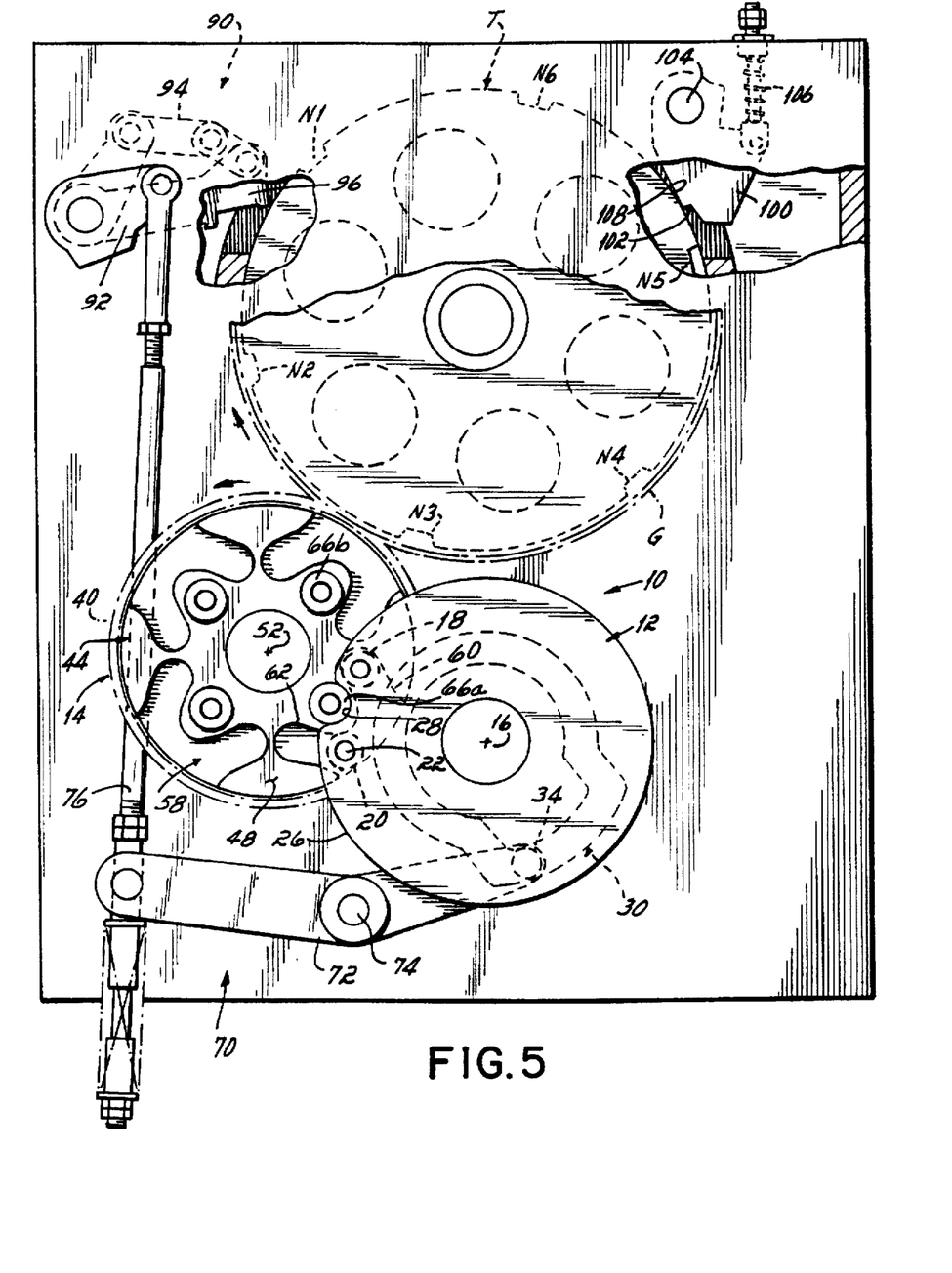
FIG. 5 is a view similar to FIG. 4 but showing the indexing members and indexed device in FIG. 6 is a view similar to FIGS. 4 and 5, but showing the indexing members and indexed device in still further rotated positions, with the positive lock mechanism just about to re-engage the indexed device.

As the driving member 12 rotates and the roller 18 engages the leading slot 60 of a slot pair 58, cam follower 34 moves generally outward into the position within the cam track 30 shown in FIG. 5. This causes the lever 72 to pivot clockwise about the pin 74, which causes the actuator arm 76 to push on the lock lever 92, which in turn causes the lifter arm 94 to rotate counterclockwise, thereby disengaging the locking pawl 96 from the notch N1 and permitting the tool-holding device T to rotate clockwise. FIG. 5 shows the tool-holding device T rotated slightly clockwise from the position shown in FIG. 4, with the positive lock mechanism 90 disengaged from the notch in device T.

Figure 6:
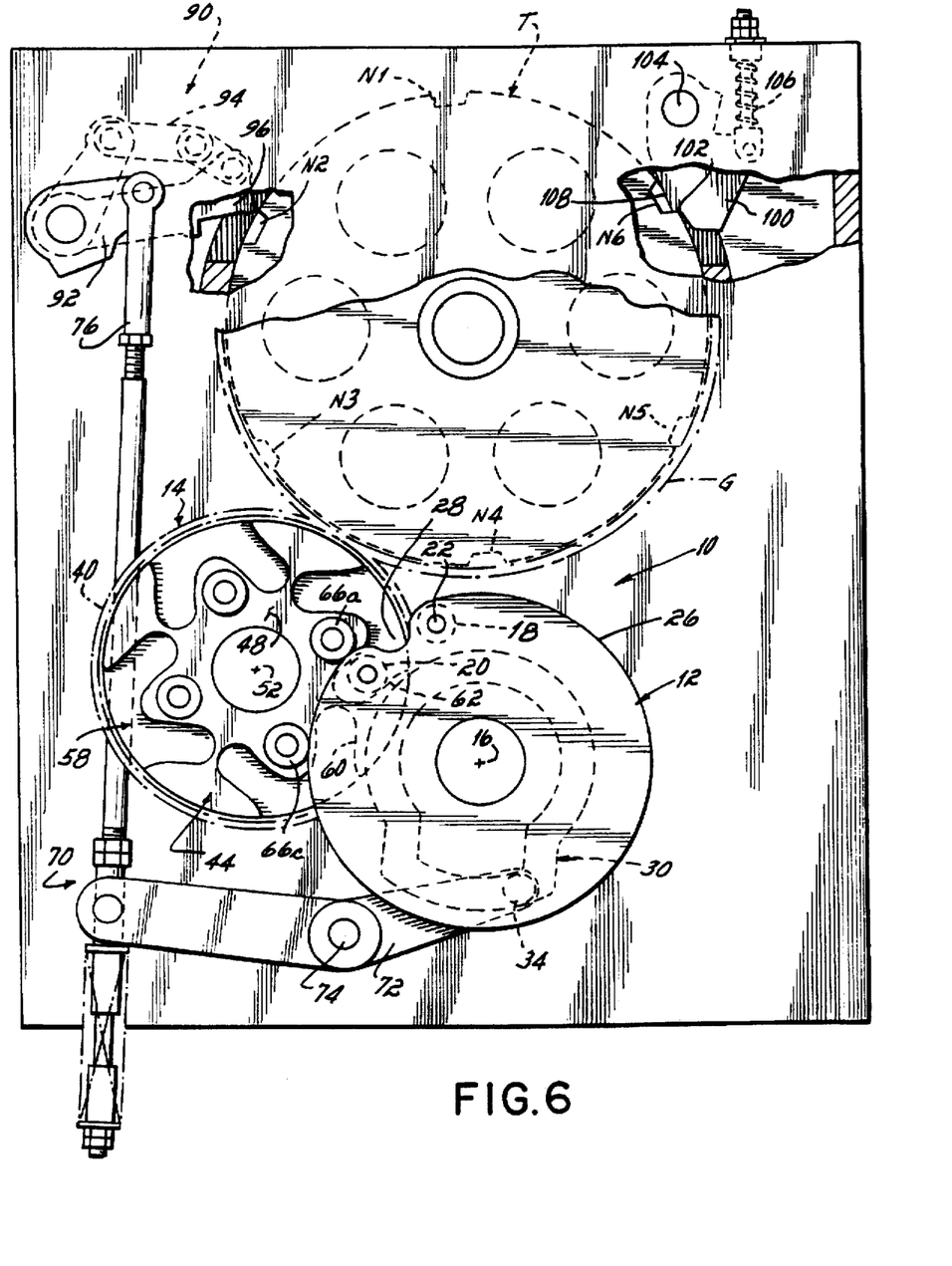

As rotation of the tool-holding device T by driven member 14 continues, the cam follower 34 moves within the cam track 30 from the position shown in FIG. 5 to the position shown in FIG. 6. With still further rotation, the roller 20 disengages from the trailing slot 62 of the slot pair 58, at which time the cam follower 34 moves generally inward as it follows the cam track 30. The inward movement of the cam follower 34 causes the lever 72 to pivot counterclockwise, thereby causing the actuator arm 76 to pull on the lock lever 92 and force the locking pawl 96 against the device T. Meanwhile, the indexing of the tool-holding device T has brought the next notch N2 into alignment with the locking pawl 96. FIG. 6 shows the locking pawl 96 just about to engage the notch N2 and prevent further clockwise rotation of the tool-holding device T.

Protection against "backlash" (counterclockwise rotation) of the tool-holding device T is provided by a ratchet 100 which is pivotally mounted on a pin 104 adjacent the tool-holding device T. The ratchet 100 is constantly urged into contact with the tool-holding device T by a spring 106. The ratchet 100 has a surface 102 that engages a counterclockwise-facing surface of one of the notches such as N5 as shown in FIG. 4 and prevents the tool-holding device T from rotating counterclockwise when it is not being indexed. When the tool-holding device T is being indexed, the periphery of the tool-holding device T contacts the sloping surface 108 on the ratchet 100, causing the ratchet 100 to pivot slightly in a counterclockwise direction, as shown in FIG. 5. When the next notch N6 comes into alignment with the ratchet 100, the ratchet, under the urging of the spring 106, then pivots clockwise back into engagement with the counterclockwise-facing surface of the notch N6, as shown in FIG. 6.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details and illustrative example shown and described. Accordingly, departures may be made from such details without departing from the spirit or scope of applicants' general inventive concept.

What is claimed is:

1. An indexing mechanism for indexing a tool-holding device, the indexing mechanism comprising:

a rotatable driven member having a pair of spaced oppositely disposed arcuate slots;

a rotatable driving member having first and second angularly spaced driving rollers, the first driving roller being movable into one of the slots during rotation of the driving member to rotatably accelerate the driven member, the second driving roller being movable into the other of the slots to decelerate and stop the rotation of the driven member;

locking means releasably locking the driven member against rotation while the driving member continues to rotate with the first and second driving rollers disengaged from the slots, the locking means including first and second angularly spaced locking rollers on the driven member adjacent the slots;

the driving member having a rotational axis and a circular peripheral surface lying at a predetermined radius from the rotational axis, the first and second locking rollers contacting the peripheral surface at angularly spaced locations with roller-engaging surfaces on the first and second locking rollers lying at a radius sufficiently smaller than the radius of the peripheral surface to preload the first and second locking rollers;

the driving member having a recess between the first and second driving rollers, the recess receiving one of the first and second locking rollers when the first driving roller is accelerating the driven member;

the driving member having an endless cam track receiving and guiding a cam follower as the driving member rotates about the rotational axis; and a linkage having a first end connected to the cam follower and a second end connected to a positive lock mechanism, the cam track being configured so that as the first driving roller on the driving member engages one of the slots in the driven member the cam track causes the cam follower to move generally away from the rotational axis of the driving member and actuate the linkage to disengage the positive lock mechanism from the tool-holding device, the cam track further being configured so that as the second driving roller on the driving member disengages the other slot in the driven member the cam track causes the cam follower to move generally toward the rotational axis of the driving member and actuate the linkage to engage the positive lock mechanism with the tool-holding device.

2. The indexing mechanism of claim 1 wherein the linkage includes a pivotal lever having one end connected to the cam follower and another end connected to an actuator arm, the actuator arm having an end connected to the positive lock mechanism, the positive lock mechanism including a pivotal locking member actuatable from an unlocked position allowing indexing of the tool-holding device to a locked position engaging the tool-holding device and preventing rotation of the tool-holding device in the indexing direction.

3. The indexing mechanism of claim 2 further comprising a pivotal ratchet lock movable from an unlocked position allowing indexing of the tool-holding device to a locked position engaging the tool-holding device when the tool-holding device is not being indexed and preventing rotation of the tool-holding device in the direction opposite to the indexing direction, the ratchet lock including a spring constantly urging the ratchet lock into contact with the tool-holding device.

* * * * *

UNITED STATES PATENT AND TRADEMARK OFFICE
CERTIFICATE OF CORRECTION

PATENT NO. : 5,720,091
DATED : February 24, 1998
INVENTOR(S) : John A. Garrett et al It is certified that error appears in the above-identified patent and that said Letters Patent is hereby corrected as shown below:

In column 1, lines 17 and 18, delete "member and the pins or rollers are angularly spaced".

In column 1, line 45, "idexing" should be ---indexing---.

In column 3, line 24, after "device in", insert ---different rotated positions, with the positive lock mechanism disengaged from the indexed device; and---.

In column 4, lines 34-39, delete "rollers 66a and 66b are "preloaded"; that is, there is an interference fit between the rollers 66a and 66b and peripheral surface 26. The rollers 66a-66d are preloaded by mounting them on the indexing disc 44 such that the roller engaging surfaces that contact the peripheral surface 26 lie on a circle whose radius from the axis 16 is slightly smaller than the radius of the peripheral surface 26."

UNITED STATES PATENT AND TRADEMARK OFFICE
CERTIFICATE OF CORRECTION

PATENT NO. : 5,720,091
DATED : February 24, 1998
INVENTOR(S) : John A. Garrett et al It is certified that error appears in the above-identified patent and that said Letters Patent is hereby corrected as shown below:

In column 6, lines 50-53, delete "with roller-engaging surfaces on the first and second locking rollers lying at a radius sufficiently smaller than the radius of the peripheral surface to preload the first and second locking rollers".

Signed and Sealed this

Twenty-ninth Day of September, 1998

Attest:

BRUCE LEHMAN

Attesting Officer

Commissioner of Patents and Trademarks